July 31, 1956
C. W. LINCOLN ET AL
2,756,605
ELECTRIC POWER STEERING
Filed May 1, 1953
2 Sheets-Sheet 1
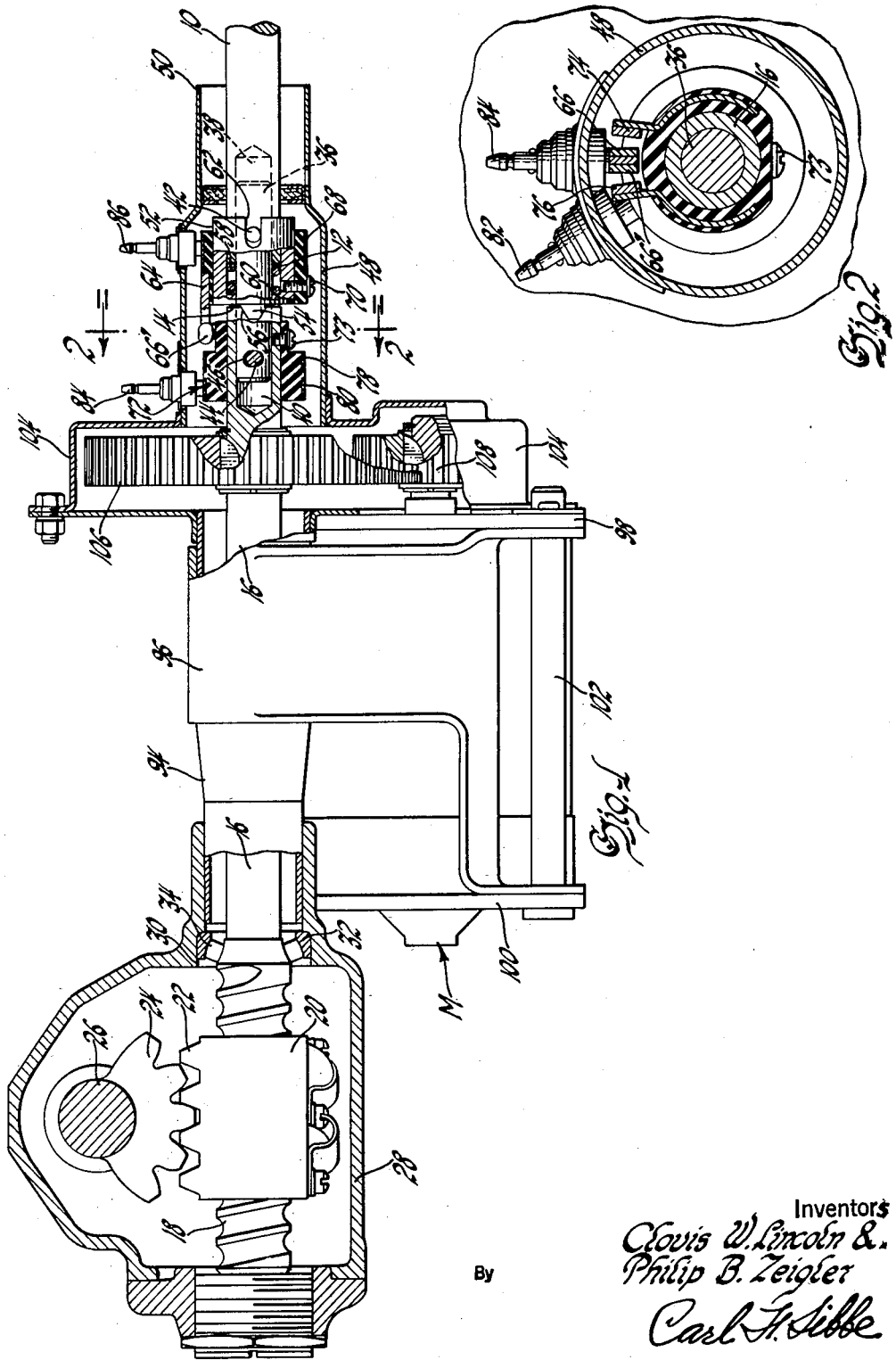
Inventors
Clovis W. Lincoln &
Philip B. Zeigler
By Carl F. Sibbe
Attorney July 31, 1956     C. W. LINCOLN ET AL     2,756,605
ELECTRIC POWER STEERING
Filed May 1, 1953          2 Sheets-Sheet 2
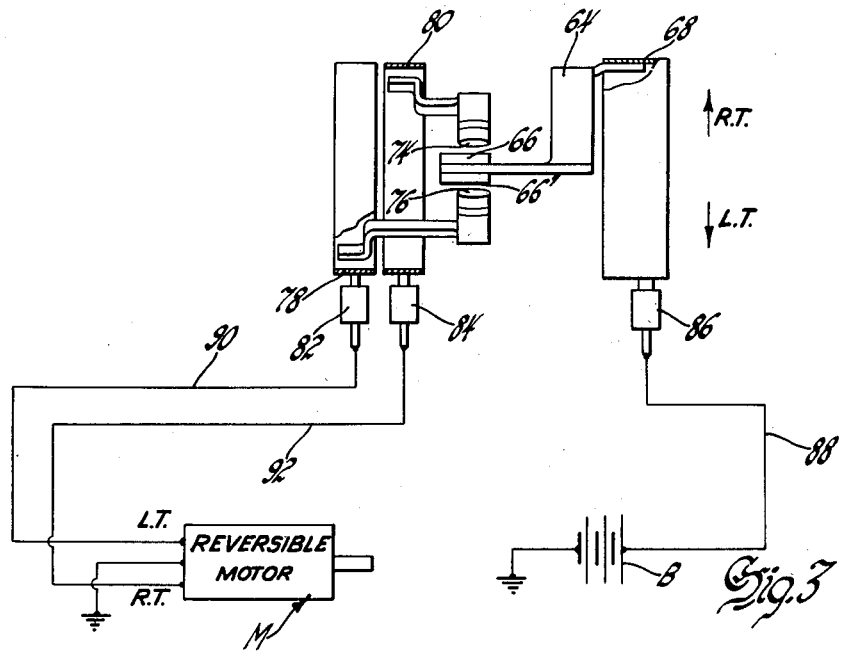
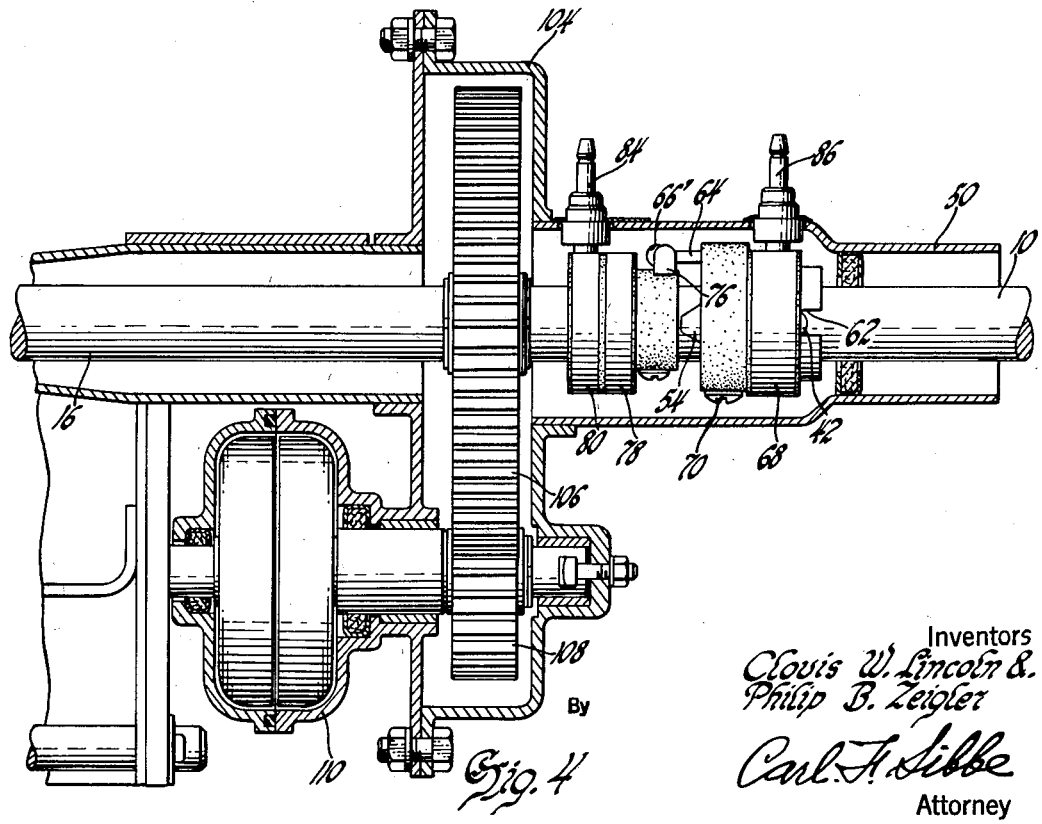
Inventors
Clovis W. Lincoln &
Philip B. Zeigler
By Carl F. Sibbe
Attorney United States Patent Office 2,756,605
Patented July 31, 1956

2,756,605

ELECTRIC POWER STEERING

Clovis W. Lincoln and Philip B. Zeigler, Saginaw, Mich., assignors to General Motors Corporation, Detroit, Mich., a corporation of Delaware Application May 1, 1953, Serial No. 352,326

11 Claims. (Cl. 74—388)

This invention relates to a follow-up mechanism and in its most specific aspect concerns a manually controlled power steering assemblage characterized in operation in that the effort applied at the steering wheel is automatically assisted by electric power means whenever the resistance to steering exceeds a predetermined value.

The power steering of trucks, buses, and heavy off-the-road vehicles has been practiced for some time; indeed in many cases, due to high front end loadings, oversize tires, etc., it is almost essential that the vehicle be so steered, the force required to turn the dirigible wheels, at least when the vehicle is stationary or traveling at low speed, exceeding the strength of many individuals. Recently power steering has been adopted for use in passenger cars and the innovation has been met with wide-spread acceptance. However, the additional cost of the auxiliary equipment, especttially when taken in relation to the over-all cost of the car has been considered objectionable in some quarters. This objection stems from the fact that the apparatuses presently available are hydraulically operated. Thus each necessarily includes four fundamental and fairly expensive components: namely, a reservoir for the fluid medium, a pump drawing from the reservoir, a power cylinder operatively linked to the steering elements, and a valve controlling the flow between the pump and power cylinder. In addition, various fixtures and auxiliary valves are required, not to mention the necessary high pressure connecting lines. The specified major parts, and especially the pump and control valve, must be manufactured to very close tolerances for successful operation, and this, of course, contributes to the cost of the apparatus.

Our invention aims to provide an electrically powered assemblage which satisfactorily performs the function of the previously proposed hydraulic gears.

Another object is to provide an electrically powered gear which is positive in operation, comprises a minimum number of inexpensive parts and is readily assembled and installed.

Another and more specific object is to supply an electrically powered gear which is characterized in operation in that the manual effort exerted at the rim of the steering wheel is proportional to the road resistance encountered.

Another specific object is to provide a gear of the type and for the purpose indicated having operating characteristics such the driver of the vehicle retains a "steering feel."

Still another specific object is to supply an electrically powered unit which allows for ordinary manual steering of the vehicle on failure of the source of power or any component of the electrical system.

Additional objects and features of the invention will appear from the following specific description which will proceed with reference to the accompanying drawings illustrating a preferred embodiment of the invention and in which:

Figure 1 is a side view of the assemblage with principal parts shown in section;

Figure 2 is a section on the line 2—2 of Figure 1;

Figure 3 is a circuit diagram; and

Figure 4 illustrates a modified form of the invention, showing in elevation certain parts appearing in section in Figure 1.

It will be understood, of course, that as installed in a vehicle the axis of the assemblage is normally disposed at a substantial angle to the horizontal.

Referring first to Figures 1 and 2, the numeral 10 indicates a steering shaft which should be considered as mounting the usual steering wheel, not shown, at its upper or right hand end. The lower or left hand end of the shaft 10 terminates at 12 short of the upper or right hand end 14 of a worm shaft 16, carrying on the worm 18 a ball nut 20 of well-known construction and operation. This nut has gear teeth 22 integral therewith, mating with a gear sector 24 fixed to or integral with a pitman shaft 26, which is connected through a drop arm, not shown, to the steering linkage of the vehicle. Such linkage may be assumed as being of any conventional or suitable type. The worm, nut, and gear sector are encased in the usual gear box 28, formed at 30 to seat an annular member 32 providing a bearing for the anti-friction elements 34. A similar bearing is normally provided at the left hand end of the gear box.

The steering shaft 10 and the worm shaft 16 are interconnected via a stub shaft 36 received in a bore 38 in the steering shaft and in a bore 40 in the worm shaft. A pin 42 fixed in the shaft 10 and in the stub shaft 36 slightly projects radially of the shaft 10 at either side. A second pin 44 extends through an elliptical hole 46 in the stub shaft and is fixed at both of its ends in the worm shaft 16. With this arrangement, it will be readily seen that while shaft 10 cannot move axially relative to shaft 16, a slight relative rotary movement of shaft 10 is possible, the extent of this rotary movement being governed by the maximum diameter of the hole 46 in the stub shaft 36.

On the end of the shaft 10 within the casing 48, which represents an enlarged extension of the usual mast jacket or housing 50, is mounted a slip ring assembly 52 comprising a tongue 54 received in a complementarily formed notch or groove 56 in the abutting end of the worm shaft 16. Preferably, there are two of these tongues, diametrically opposed, and two notches in the worm shaft, similarly opposed. A spring 58 surrounding the stub shaft 36 and bearing on an annular shoulder 60 within the slip ring assembly and on the end of the steering shaft at 12, urges the slip ring assemblly as a whole to the left so that the tongue 54 is normally seated in the notch at the end of the worm shaft. Thus, shaft 10 can be rotated relative to the worm shaft 16 to the extent permitted by the pin and elliptical slot connection 44, 46 only when the steering resistance, i. e. the resistance to turning of the shaft 16, is such as to cause the tongue to back or cam out of the notch against the force of the spring 58. The tongue being an integral part of the body of the slip ring assembly 52, this action is necessarily accompanied by axial shifting of the entire assembly to the right.

It is by means of the spring 58 plus the frictional forces tending to prevent parting of the connection 54, 56 on rotation of the shaft 10 that a steering "feel" is provided according to the invention. Any relative turning of the shaft must overcome these forces and the resistance of the spring, which tends to maintain the shaft in a centered or neutral condition with respect to shaft 16. It is our practice to employ a spring of a resistance such that about three pounds of manual effort at the rim of the steering wheel are required to induce relative rotation of the steering shaft.

The slip ring assembly 52 will be noted as having notches 62 (only one shown) of a width approximating the diameter of the pin 42, the ends of which are disposed within the notches outwardly of the surfaces representing the maximum depth of the notches. Pin 42 thus limits the axial movement of the slip ring assembly 52 as required to prevent the tongue 54 from leaving the notch 56 completely and at the same time precludes rotation of the steering shaft 10 relative to the slip ring assembly.

Assembly 52 carries a switch arm 64 terminating in a double contact 66, 66' (Fig. 2) and also carries a brush 68, these parts being interconnected (Fig. 3) and suitably insulated. A screw 70 secures the insulation and with it the switch arm and brush, which are partially imbedded in the insulation, to the body of the assembly.

A contact unit 72 fixedly mounted on the worm shaft 16 by means of a screw 73 in spaced realtion to the assembly 52 includes a pair of contacts 74, 76 disposed at either side of the double contact 66, 66' at the end of the arm 64. The spacing between contact 66 and contact 74 or between 66' and contact 76 is equivalent to slightly less than the maximum angle through which the shaft 10 may be rotated relative to the worm shaft 16, as governed by the maximum diameter of the elliptical hole 46. All of these contacts should be noted as resiliently supported for reasons which will be later apparent.

In addition to the contacts 74, 76 the assembly 72 includes a pair of brushes 78, 80 on which ride spring or weight-loaded plunger contacts 82, 84 respectively. A similar plunger contact 86 rides on the brush 68 associated with the assembly 52. Plunger contact 86 (Fig. 3) is connected to the battery B of the vehicle via a line 88, while plunger contacts 82, 84 which are electrically linked to contacts 76 and 74 through brushes 78 and 80, are provided with lead lines 90, 92 extending to a split field, series wound D.-C. reversible motor, indicated by the letter M in Fig. 1. This motor is fastened to a jacket 94 surrounding the worm shaft 16 via a bracket 96 and is secured through a plate 98, connected to an opposing plate 100 by tie rods 102, to a housing 104 disposed at a 90° angle to the jacket 94.

Within the housing 104 is the gearing through which the motor M drives the worm shaft 16. This gearing as shown consists of a spur gear 106 keyed to the worm shaft and a mating pinion 108 fixed on the shaft of the motor. The relative diameters of the pinion and gear are determined by the speed of steering desired.

In the arrangement of Fig. 4 wherein like parts in the other figures are identified by like numerals, it will be noted that the motor M is here operatively linked to the worm shaft 16 through a fluid coupling 110, which may be of any suitable construction. Using such a coupling, the motor is permitted to arrive closer to full speed before maximum torque is applied, hence a somewhat smaller and cheaper motor may be employed.

In the operation of the vehicle equipped with the assemblage, let it be assumed that the vehicle is proceeding down a relatively straight, relatively smooth highway at normal cruising speeds. The steering in this case will be entirely manual, the resistance to steering being insufficient to bring about rotation of the steering shaft relative to the worm shaft to the extent required to cause energization of the motor. In the selection of the spring 58, it is, of course, taken into account that manual steering of the vehicle necessarily involves turning of the armature of the motor or the driven member of the coupling 110, as the case may be.

Assuming a right turn at low speeds or in parking, due to the increased steering resistance, the initial clockwise turning of the steering shaft does not give rise to a corresponding movement of the worm shaft, which remains stationary or essentially so. Accordingly, the tongue 54 of the assembly 52 backs out of the notch in the worm shaft, the contact 66 engages with the contact 74 and the reversible motor is energized to power the worm shaft to the right through the pinion 108 and the gear 106. Once the operator ceases to turn the wheel, the assembly 52 is restored to its normal position by the action of the spring 58 and the contact 66, 74 is broken. The geometry of the steering linkages is no-wise affected by the described gear, hence the normal tendency of the dirigible wheels to assume a straight-ahead position is retained.

In the event of a left turn rather than a right turn at low speeds or in parking, the action is as just described except the motor is energized through the contacts 66' and 76, the motor as a consequence powering the worm shaft to the left.

Should a failure in the electrical system occur at anytime the vehicle is steered manually through the pin 44 with little lost motion, since as previously indicated, the maximum diameter of the elliptical slot 46 represents only a very slight over-running of the spacing between the contacts 66—74 and 66'—76.

We claim:

1. A follow-up mechanism comprising in combination a working member supported for rotary movement, electric power means operatively linked to said member, a rotatably supported manually actuable control member connected to said working member via means permitting limited rotary movement thereof relative to said working member, a switch member associated with said control member for rotation therewith and axially movable within set limits relative to said working and control members, said switch member having a connection with said working member which tends to part on turning of said control member, normally disengaged electric contact means carried by said working and switch members, said contact means representing components of a circuit comprising said electric power means and a source of electric power, and yieldable means associated with said control member and said switch member which on the turning of said control member in the operation of the mechanism serves to prevent parting of said partable connection with resultant rotary movement of said switch member and said control member relative to said working member and energization of said electric power means through said contact means in the absence of a predetermined load on said working member.

2. A follow-up mechanism comprising in combination a working member supported for rotary movement, electric power means operatively linked to said member, a rotatably supported manually actuable control member connected to said working member via means permitting limited rotary movement thereof relative to said working member, a switch member associated with said control member for rotation therewith and axially movable within set limits relative to said working and control members, said switch member having a connection with said working member which tends to part on turning of said control member, normally disengaged yieldable electric contact means carried by said working and switch members, said contact means representing components of a circuit comprising said electric power means and a source of electric power, and yieldable means associated with said control member and said switch member, which on the turning of said control member in the operation of the mechanism serves to prevent parting of said partable connection with resultant rotary movement of said switch member and said control member relative to said working member and energization of said electric power means through said contact means in the absence of a predetermined load on said working member—the thus defined mechanism being further characterized in that the setting of the means permitting the limited rotary movement of the said control member relative to the said working member only slightly over-runs the spacing between said contact means as normally disposed whereby on the occurrence of any electrical failure the mechanism may be operated solely by manual effort without excessive lost motion.

3. A follow-up mechanism comprising in combination a working member supported for rotary movement, electric power means operatively linked to said member, a rotatably supported, manually actuable control member connected to said working member via means permitting limited rotary movement thereof relative to said working member, a pair of suitably insulated contacts carried by said working member in opposed relation and connected to said electric power means, a switch member on said control member axially movable relative to said control and working members and having a cam and slot connection with said working member normally precluding rotary movement of said switch member realtive to said working member, the axial movement of said switch member being limited in one direction by said connection and in the other direction by means associated with said control member, said last-mentioned means serving additionally to prevent rotary movement of said switch member relative to said control member, a contact element carried by said switch member adapted to be connected to a source of electric power and terminating at a point mediate the contacts carried by said working member, and yieldable means associated with said control member and said switch member which on the manual turning of said control member in the operation of the mechanism serves to prevent parting of said cam and slot connection with resultant rotary movement of said switch member and said control member relative to said working member and energization of said electric power means through said element and one of said contacts in the absence of a predetermined load on said working member.

4. A follow-up mechanism comprising in combination a working member supported for rotary movement, electric power means operatively linked to said member, a rotatably supported, manually actuable control member connected to said working member via means permitting limited rotary movement thereof relative to said working member, a pair of suitably insulated, yieldably mounted contacts carried by said working member in opposed relation and connected to said electric power means, a switch member on said control member axially movable relative to said control and working members and having a cam and slot connection with said working member normally precluding rotary movement of said switch member relative to said working member, the axial movement of switch member being limited in one direction by said connection and in the other direction by means associated with said control member, said last-mentioned means serving additionally to prevent rotary movement of said switch member relative to said control member, a yieldable contact element carried by said switch member adapted to be connected to a source of electric power and terminating at a point mediate the contacts carried by said working member, and yieldable means associated with said control member and said switch member, which on the manual turning of said control member in the operation of the mechanism serves to prevent parting of said cam and slot connection with resultant rotary movement of said switch member and said control member relative to said working member and energization of said electric power means through said element and one of said contacts in the absence of a predetermined load on said working member—the thus defined mechanism being further characterized in that the setting of the means permitting the limited rotary movement of the said control member relative to the said working member only slightly over-runs the spacing between said element and either of said contacts as these are normally disposed, whereby on the occurrence of any electrical failure the mechanism may be operated solely by manual effort without excessive lost motion.

5. A steering gear assemblage comprising in combination a worm shaft supported for rotary movement, an electric motor operatively linked to said shaft to power the same, a rotatably supported steering shaft connected to said worm shaft via means permitting limited rotary movement thereof relative to said working member, a switch member associated with said steering shaft for rotation therewith, said switch member being axially movable within set limits relative to said shafts and having a connection with said worm shaft which tends to part on turning of said steering shaft, normally disengaged electric contact means carried by said worm shaft and said switch member, said contact means representing components of a circuit comprising said electric motor and the battery of the vehicle to which the assemblage is to be applied, and yieldable means associated with said steering shaft and said switch member which on the turning of the steering shaft in the operation of the assemblage serves to prevent parting of said partable connection with resultant rotary movement of said switch member and said steering shaft relative to said worm shaft and energization of said electric motor through said contact means in the absence of a predetermined steering resistance.

6. A steering gear assemblage comprising in combination a worm shaft supported for rotary movement, an electric motor geared to said worm shaft, a rotatably supported steering shaft connected to said worm shaft via means permitting limited rotary movement thereof relative to said worm shaft, a switch member associated with said steering shaft for rotation therewith, said switch member being axially movable within set limits relative to said shafts and having a connection with said worm shaft which tends to part on turning of said steering shaft, normally disengaged yieldable electric contact means carried by said worm shaft and switch member, said contact means representing components of a circuit comprising said electric motor and the battery of the vehicle to which the assemblage is to be applied, and yieldable means associated with said steering shaft and said switch member, which on the turning of the said steering shaft in the operation of the assemblage serves to prevent parting of said partable connection with resultant rotary movement of said switch member and said steering shaft relative to said worm shaft and energization of said electric motor through said contact means in the absence of a predetermined steering resistance—the thus defined assemblage being further characterized in that the setting of the means permitting the limited rotary movement of the said steering shaft relative to the said worm shaft only slightly over-runs the spacing between the said contact means as normally disposed, whereby on the occurrence of any electrical failure the assemblage may be operated solely by manual effort without excessive lost motion.

7. A steering gear assemblage comprising in combination a worm shaft supported for rotary movement, an electric motor geared to said worm shaft, a rotatably supported steering shaft connected to said worm shaft via means permitting limited rotary movement thereof relative to said working member, a pair of suitably insulated contacts carried by said worm shaft in opposed relation and connected to said electric motor, a switch member on said steering shaft axially movable relative to said shafts and having a cam and slot connection with said worm shaft normally precluding rotary movement of said switch member relative to said worm shaft, the axial movement of said switch member being limited in one direction by said connection and in the other direction by means associated with said steering shaft, said last-mentioned means serving additionally to prevent rotary movement of said switch member relative to said steering shaft, a contact element carried by said switch member adapted to be connected to the battery of the vehicle to which the assemblage is applied and terminating at a point mediate the contacts carried by said worm shaft, and yieldable means associated with said steering shaft and said switch member, which on the manual turning of said steering shaft in the operation of the assemblage serves to prevent parting of said cam and slot connection with resultant rotary movement of said switch member and said steering shaft relative to said worm shaft and energization of said electric motor through said element and one of said contacts in the absence of a predetermined steering resistance.

8. A steering gear assemblage comprising in combination a worm shaft supported for rotary movement, an electric motor geared to said worm shaft, a rotatably supported steering shaft connected to said worm shaft via means permitting limited rotary movement thereof relative to said worm shaft, a pair of suitably insulated, yieldably mounted contacts carried by said worm shaft in opposed relation and connected to said electric motor, a switch member on said steering shaft axially movable relative to said shafts and having a cam and slot connection with said worm shaft normally precluding rotary movement of said switch member relative to said worm shaft, the axial movement of said switch member being limited in one direction by said connection and in the other direction by means associated with said steering shaft, said last-mentioned means serving additionally to prevent rotary movement of said switch member relative to said steering shaft, a yieldable contact element carried by said switch member adapted to be connected to the battery of the vehicle to which the assemblage is applied and terminating at a point mediate the contacts carried by said worm shaft, and yieldable means associated with said steering shaft and said switch member, which on the manual turning of said steering shaft in the operation of the assemblage serves to prevent parting of said cam and slot connection with resultant rotary movement of said switch member and said steering shaft relative to said worm shaft and energization of said electric motor through said element and one of said contacts in the absence of a predetermined steering resistance—the thus defined assemblage being further characterized in that the setting of the means permitting the limited rotary movement of the said steering shaft relative to the said worm shaft only slightly over-runs the spacing between the said element and either of the said contacts as these are normally disposed, whereby on the occurrence of any electrical failure the assemblage may be operated solely by manual effort without excessive lost motion.

9. A follow-up mechanism comprising in combination a working member supported for rotary movement, electric power means operatively linked to said member through a fluid coupling, a rotatably supported, manually actuable control member connected to said working member via means permitting limited rotary movement thereof relative to said working member, a switch member associated with said control member for rotation therewith, said switch member being axially movable within set limits relative to said working and control members and having a connection with said working member which tends to part on turning of said control member, normally disengaged electric contact means carried by said working and switch members, said contact means representing components of a circuit comprising said electric power means and a source of electric power, and yieldable means associated with said control member and said switch member, which on the turning of said control member in the operation of the mechanism serves to prevent parting of said partable connection with resultant rotary movement of said switch member and said control member relative to said working member and energization of said electric power means through said contact means in the absence of a predetermined load on said working member.

10. A steering gear assemblage comprising in combination a worm shaft supported for rotary movement, an electric motor operatively linked to said shaft through a fluid coupling, a rotatably supporting steering shaft connected to said worm shaft via means permitting limited rotary movement thereof relative to said working member, a switch member associated with said steering shaft for rotation therewith, said switch member being axially movable within set limits relative to said shafts and having a connection with said worm shaft which tends to part on turning of said steering shaft, normally disengaged electric contact means carried by said worm shaft and switch member, said contact means representing components of a circuit comprising said electric motor and the battery of the vehicle to which the assemblage is to be applied, and yieldable means associated with said steering shaft and said switch member, which on the turning of the steering shaft in the operation of the assemblage serves to prevent parting of said partable connection with resultant rotary movement of said switch member and said steering shaft relative to said worm shaft and energization of said electric motor through said contact means in the absence of a predetermined steering resistance.

11. A steering gear assemblage comprising in combination a worm shaft supported for rotary movement, an electric motor operatively linked to said shaft through a fluid coupling, a rotatably supported steering shaft connected to said worm shaft via means permitting limited rotary movement thereof relative to said worm shaft, a switch member associated with said steering shaft for rotation therewith, said switch member being axially movable within set limits relative to said shafts and having a connection with said worm shaft which tends to part on turning of said steering shaft, normally disengaged yieldable electric contact means carried by said worm shaft and switch member, said contact means representing components of a circuit comprising said electric motor and the battery of the vehicle to which the assemblage is to be applied, and yieldable means associated with said steering shaft and said switch member, which on the turning of the said steering shaft in the operation of the assemblage serves to prevent parting of said partable connection with resultant rotary movement of said switch member and said steering shaft relative to said worm shaft and energization of said electric motor through said contact means in the absence of a predetermined steering resistance—the thus defined assemblage being further characterized in that the setting of the means permitting the limited rotary movement of the said steering shaft relative to the said worm shaft only slightly over-runs the spacing between the said contact means as normally disposed, whereby on the occurrence of any electrical failure the assemblage may be operated solely by manual effort without excessive lost motion.

References Cited in the file of this patent

UNITED STATES PATENTS

| | | |
|---|---|---|
| 2,553,795 | Staude | May 22, 1951 |
| 2,587,377 | Penrose | Feb. 26, 1952 |